United States Patent
Grauman et al.

(10) Patent No.: US 9,292,517 B2
(45) Date of Patent: Mar. 22, 2016

(54) EFFICIENTLY IDENTIFYING IMAGES, VIDEOS, SONGS OR DOCUMENTS MOST RELEVANT TO THE USER BASED ON ATTRIBUTE FEEDBACK

(71) Applicant: Board of Regents, The University of Texas System, Austin, TX (US)

(72) Inventors: Kristen Grauman, Austin, TX (US); Adriana Kovashka, Austin, TX (US); Devi Parikh, Blacksburg, VA (US)

(73) Assignee: Board of Regents, The University of Texas System, Austin, TX (US)

( * ) Notice: Subject to any disclaimer, the term of this patent is extended or adjusted under 35 U.S.C. 154(b) by 325 days.

(21) Appl. No.: 13/965,594

(22) Filed: Aug. 13, 2013

(65) Prior Publication Data
US 2014/0188863 A1    Jul. 3, 2014

Related U.S. Application Data

(60) Provisional application No. 61/748,505, filed on Jan. 3, 2013.

(51) Int. Cl.
*G06F 17/30* (2006.01)
(52) U.S. Cl.
CPC .................. *G06F 17/30038* (2013.01)
(58) Field of Classification Search
CPC ................................. G06F 17/30038
USPC ................................. 707/728, 766
See application file for complete search history.

(56) References Cited

U.S. PATENT DOCUMENTS

| | | |
|---|---|---|
| 7,878,390 B1 | 2/2011 | Batten et al. |
| 2001/0056415 A1 | 12/2001 | Zhu et al. |
| 2003/0063779 A1 | 4/2003 | Wrigley |
| 2004/0068486 A1 | 4/2004 | Chidlovskii |
| 2005/0055344 A1* | 3/2005 | Liu .................. G06F 17/30256 |
| 2005/0154686 A1 | 7/2005 | Corston et al. |
| 2011/0210978 A1 | 9/2011 | Sara et al. |
| 2011/0313548 A1 | 12/2011 | Taylor et al. |

OTHER PUBLICATIONS

Kovashka et al., "WhittleSearch: Image Search with Relative Attribute Feedback," Proceedings of the IEEE Conference on Computer Vision and Pattern Recognition (CVPR), Jun. 2012.

(Continued)

*Primary Examiner* — Alexey Shmatov
(74) *Attorney, Agent, or Firm* — Robert A. Voigt, Jr.; Winstead, P.C.

(57) ABSTRACT

A method, system and computer program product for efficiently identifying images, videos, audio files or documents relevant to a user. Using either manual annotations or learned functions, the method predicts the relative strength of an attribute in an image, video, audio file or document from a pool of images, videos, audio files or documents. At query time, the system presents an initial set of reference images, videos, audio files or documents, and the user selects among them to provide relative attribute feedback. Using the resulting constraints in the multi-dimensional attribute space, the relevance function for the pool of images, videos, audio files or documents is updated and the relevance of the pool of images, videos, audio files or documents is re-computed. This procedure iterates using the accumulated constraints until the top-ranked images, videos, audio files or documents are acceptably close to the user's envisioned image, video, audio file or document.

21 Claims, 4 Drawing Sheets

(56) References Cited

OTHER PUBLICATIONS

Parikh et al., "Relative Attributes," Proceedings of the International Conference on Computer Vision (ICCV), Barcelona, Spain, Nov. 2011.
Kumar et al., "FaceTracer: A Search Engine for Large Collections of Images with Faces," Proceedings of the 10th European Conference on Computer Vision (ECCV), pp. 340-353, Oct. 2008.
Siddiquie et al., Image Ranking and Retrieval Based on Multi-Attribute Queries, IEEE Conference on Computer Vision and Pattern Recognition (CVPR), pp. 801-808, Jun. 20-25, 2011.
U.S. Patent Application entitled "Efficiently Identifying Images, Videos, Songs or Documents Most Relevant to the User Using Binary Search Trees on Attributes for Guiding Relevance Feedback," filed with U.S. Patent Office on Aug. 13, 2013.
Reid et al., "Using Comparative Human Descriptions for Soft Biometrics," The First International Joint Conference on Biometrics, Washington, D.C., Oct. 11-13, 2011.
Search Report and Written Opinion for International Application No. PCT/US13/54700 dated Feb. 27, 2014, pp. 1-7.
Kovashka et al., "WhittleSearch: Image Search with Relative Attribute Feedback," Proceedings of the IEEE Conference on Computer Vision and Pattern Recognition (CVPR), Jun. 16-21, 2012, pp. 2973-2980.
Chen et al., "Less is More, Probabilistic Models for Retrieving Fewer Relevant Documents," http://citeseerx.ist.psu.edu/viewdoc/download?doi=10.1.1.125.2701&rep=rep1&type=pdf, SIGIR'06, Aug. 6-11, 2006, pp. 1-8.
Trotman et al., "Identifying and Ranking Relevant Document Elements," 2003, pp. 1-5.
Office Action for U.S. Appl. No. 13/965,677 dated May 12, 2015, pp. 1-24.
International Preliminary Report on Patentability for International Application No. PCT/US2013/054717 dated Jul. 16, 2015, pp. 1-7.
International Preliminary Report on Patentability for International Application No. PCT/US2013/054700 dated Jul. 16, 2015, pp. 1-6.
Search Report and Written Opinion for International Application No. PCT/US13/54717 dated Feb. 21, 2014, pp. 1-14.

\* cited by examiner

IMAGE 1        IMAGE 2

IS THE SHOE IN IMAGE 1 MORE OR LESS FEMININE THAN THE SHOE IN IMAGE 2?
- ○ THE SHOE IN IMAGE 1 IS MORE FEMININE THAN THE SHOE IN IMAGE 2.
- ○ THE SHOE IN IMAGE 1 IS LESS FEMININE THAN THE SHOE IN IMAGE 2.
- ○ THE SHOES IN IMAGE 1 AND IMAGE 2 ARE EQUALLY FEMININE.

EFFICIENTLY IDENTIFYING IMAGES, VIDEOS, SONGS OR DOCUMENTS MOST RELEVANT TO THE USER BASED ON ATTRIBUTE FEEDBACK

CROSS REFERENCE TO RELATED APPLICATIONS

This application is related to the following commonly owned U.S. patent application:

Provisional Application Ser. No. 61/748,505, "Efficiently Identifying Images Most Relevant to the User Based on Attribute Feedback," filed Jan. 3, 2013, and claims the benefit of its earlier filing date under 35 U.S.C. §119(e).

GOVERNMENT INTERESTS

The U.S. Government has certain rights in this invention pursuant to the terms of the Office of Naval Research Grant No. N00014-11-1-0105P00003.

TECHNICAL FIELD

The present invention relates to information retrieval, and more particularly to efficiently identifying images (e.g., photographs, illustrations, online products), videos, audio files (e.g., music, clips, songs), or documents (e.g., web pages) that are most relevant to the user based on attribute feedback.

BACKGROUND

In image searching, users have a mental picture of content, such as images, desired to be retrieved. For example, a shopper wants to retrieve those catalog pages that match the shopper's envisioned style of clothing. In another example, a witness wants to help law enforcement locate a suspect in a database based on his/her memory of the face of the suspect. In a further example, a web page designer wants to find a stock photograph suitable for his/her customer's brand image. Oftentimes, such images are attempted to be retrieved based on simple keyword searching. However, such content or images (e.g., illustrations, photographs, online products) are not easily identified and retrieved based on simple keyword searching. In a similar manner, in other domains, such as video, document, or music retrieval, it is difficult to accurately meet a user's search needs if relying on keyword search alone.

As a result, interactive search techniques have been developed to attempt to identify and retrieve the content envisioned by the user by allowing the user to iteratively refine the results retrieved by the system. The basic idea in such techniques is to show the user candidate results, obtain feedback, and adapt the system's relevance ranking function accordingly. However, existing image search methods provide only a narrow channel of feedback to the system. Typically, a user refines the retrieved images via binary feedback ("relevant" or "irrelevant") on exemplary images provided to the user or else attempts to tune the system parameters, such as weights on a small set of low-level features (e.g., texture, color, edges, shape). The latter is clearly a burden for a user who likely cannot understand the inner workings of the algorithm. The former feedback is more natural to supply, yet it leaves the system to infer what about those images the user found relevant or irrelevant, and therefore can be slow to converge on the user's envisioned content in practice. In a similar manner, binary relevance feedback on videos, audio files, documents, or other database items can be insufficient to accurately convey the user's search needs in those other domains.

BRIEF SUMMARY

In one embodiment of the present invention, a method for efficiently identifying images, videos, audio files or documents relevant to a user comprises determining a set of ranking functions, each of which predicts or assigns a relative strength of an attribute in an image, video, audio file or document from a pool of database images, videos, audio files or documents. The method further comprises presenting a set of reference images, videos, audio files or documents from the pool of database images, videos, audio files or documents. Furthermore, the method comprises receiving a selection of one or more images, videos, audio files or documents from the set of reference images, videos, audio files or documents along with relative attribute feedback pertaining to one or more attributes of the selected one or more images, videos, audio files or documents. Additionally, the method comprises revising, by a processor, a system's model of what images, videos, audio files or documents are relevant to the user using the relative attribute feedback. The method optionally continues, at each iteration integrating the user's relative attribute feedback on any and all of the chosen attributes and images, videos, audio files or documents.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
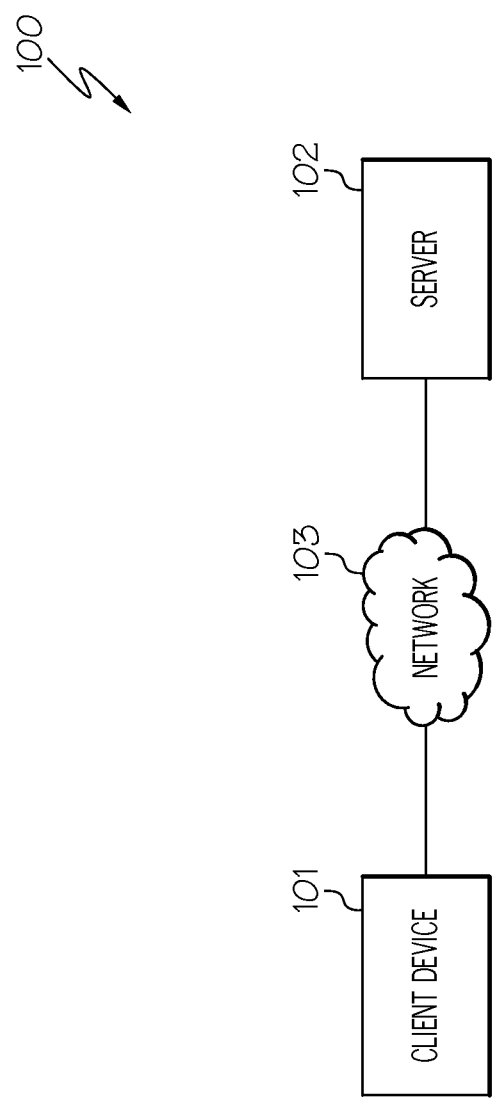
FIG. 1 illustrates a network system configured in accordance with an embodiment of the present invention.

The present invention comprises a method, system and computer program product for efficiently identifying images, videos, audio files or documents most relevant to a user. In one embodiment of the present invention, a set of ranking functions is learned, where each of the ranking functions predicts a relative strength of an attribute in an image, video, audio file or document from a pool of database images, videos, audio files or documents. For example, in images or videos, attributes might be properties like "shininess," "redness," "formality," "busyness," "natural," etc. Similarly, in audio files, attributes might be properties like "tempo," "clarity," "sadness," "dance-like," etc. Similarly, in documents, attributes might be properties like "conservativeness," "brevity," "opinionated," "positive sentiment," etc. Upon the system presenting a set of reference images, videos, audio files or documents from the pool of database images, videos, audio files or documents to the user, the user performs a comparison review between the set of reference images, videos, audio files or documents and the user's envisioned image, video, audio file or document. The system receives a selection of one or more images, videos, audio files or documents from the set of reference images, videos, audio files or documents along with relative attribute feedback (e.g., shinier than these shoes) pertaining to an attribute (e.g., shininess) of the selected images, videos, audio files or documents. The relevance ranking function for the pool of database images, videos, audio files or documents is updated in response to receiving the attribute feedback pertaining to the attribute of the selected images, videos, audio files or documents. This relevance ranking function reflects how relevant each item is expected to be to the user. The pool of database images, videos, audio files or documents is re-ranked and a top-ranked set of the re-ranked pool of database images, videos, audio files or documents is displayed to the user. The above-described process (e.g., user will perform a further comparison review of these top-ranked images, provide relative attribute feedback, etc.) continues until an image, video, audio file or document of the displayed top-ranked set of database images, videos, audio files or documents is acceptable to the user (such an image, video, audio file or document is the most relevant to the user). In this manner, the user is able to efficiently "whittle away" irrelevant portions of the feature space, using semantic language to precisely communicate the user's preferences to the system, thereby improving the search speed and accuracy. For example, for some number of feedback statements, the system's accuracy can be higher; and also to achieve a given level of accuracy, the system may require a smaller number of feedback statements.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

While the following discusses the present invention in connection with image searching, the principles of the present invention may be applied to other information retrieval tasks, such as video searching, document searching (e.g., navigating through news articles using semantic attribute feedback about text topics) and music searching (e.g., finding an audio file that has a faster tempo but with a more sad mood, where tempo and mood are musical attributes). A person of ordinary skill in the art would be capable of applying the principles of the present invention to such implementations. Further, embodiments applying the principles of the present invention to such implementations would fall within the scope of the present invention. In the following, descriptions in terms of searching for an image should be similarly understood in terms of searching for a video, document, or audio file.

Referring now to the Figures in detail, FIG. 1 illustrates a network system 100 for practicing the principles of the present invention in accordance with an embodiment of the present invention. Network system 100 includes a client device 101 connected to a server 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to network 103 and consequently communicating with server 102. Such communication includes, but is not limited to, providing semantic terms (e.g., degree of brightness of a scene, degree of pointedness of a pair of shoes) to an application of server 102 configured to identify images (e.g., photographs, illustrations, online products) that are most relevant to the user of client device 101 based on attribute feedback from the user as discussed further below. A description of the hardware configuration of server 102 is provided below in connection with FIG. 2.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

While FIG. 1 illustrates a single client device 101, server 102 and network 103, network system 100 may include any number of client devices 101, servers 102 and networks 103. The embodiments of network system 100 are not to be limited in scope to the depiction of FIG. 1. Furthermore, the principles of the present invention are not to be limited in scope to the requirement of a use of a network system, such as network system 100.

Figure 2:
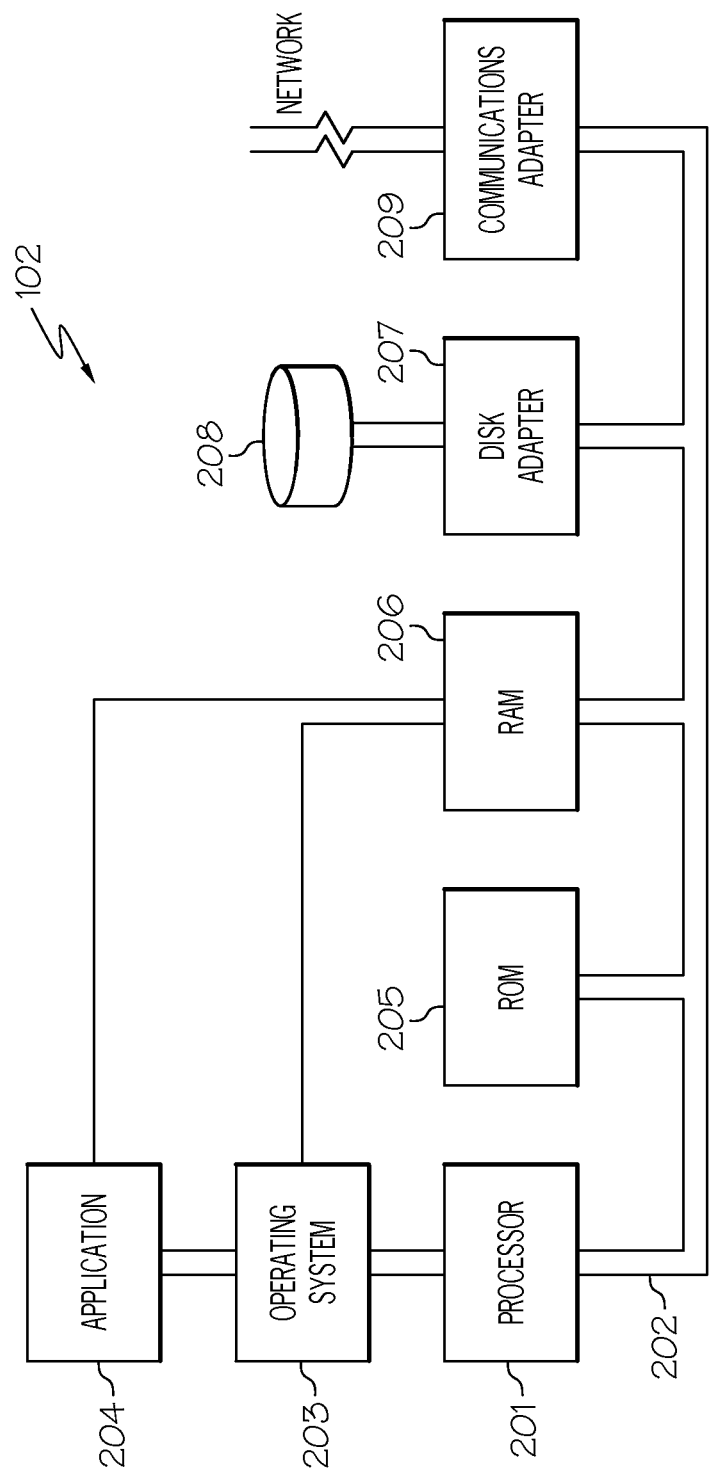
FIG. 2 illustrates a hardware configuration of a server configured in accordance with an embodiment of the present invention.

Referring now to FIG. 2, FIG. 2 illustrates a hardware configuration of server 102 (FIG. 1) which is representative of a hardware environment for practicing the present invention. Server 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, an application for identifying images (e.g., photographs, illustrations, online products) that are most relevant to the user of client device 101 based on attribute feedback from the user as discussed further below in association with FIGS. 3-5.

Referring again to FIG. 2, read-only memory ("ROM") 205 is coupled to system bus 202 and includes a basic input/output system ("BIOS") that controls certain basic functions of server 102. Random access memory ("RAM") 206 and disk adapter 207 are also coupled to system bus 202. It should be noted that software components including operating system 203 and application 204 may be loaded into RAM 206, which may be server's 102 main memory for execution. Disk adapter 207 may be an integrated drive electronics ("IDE") adapter that communicates with a disk unit 208, e.g., disk drive. It is noted that the application for identifying images (e.g., photographs, illustrations, online products) that are most relevant to the user of client device 101 based on attribute feedback from the user, as discussed further below in association with FIGS. 3-5, may reside in disk unit 208 or in application 204.

Server 102 may further include a communications adapter 209 coupled to bus 202. Communications adapter 209 interconnects bus 202 with an outside network (e.g., network 103 of FIG. 1) thereby enabling server 102 to communicate with other client devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, interactive search techniques have been developed to attempt to identify and retrieve the content envisioned by the user by allowing the user to iteratively refine the results retrieved by the system. The basic idea in such techniques is to show the user candidate results, obtain feedback, and adapt the system's relevance ranking function accordingly. However, existing image search methods (and video, document, and music search methods) provide only a narrow channel of feedback to the system. Typically, a user refines the retrieved images (or videos, documents, or music) via binary feedback ("relevant" or "irrelevant") on exemplary images (or videos, documents, or music) provided to the user or else attempts to tune the system parameters, such as weights on a small set of low-level features (e.g., texture, color, edges). The latter is clearly a burden for a user who likely cannot understand the inner workings of the algorithm. The former feedback is more natural to supply, yet it leaves the system to infer what about those images the user found relevant or irrelevant, and therefore can be slow to converge on the user's envisioned content in practice.

Figure 3:
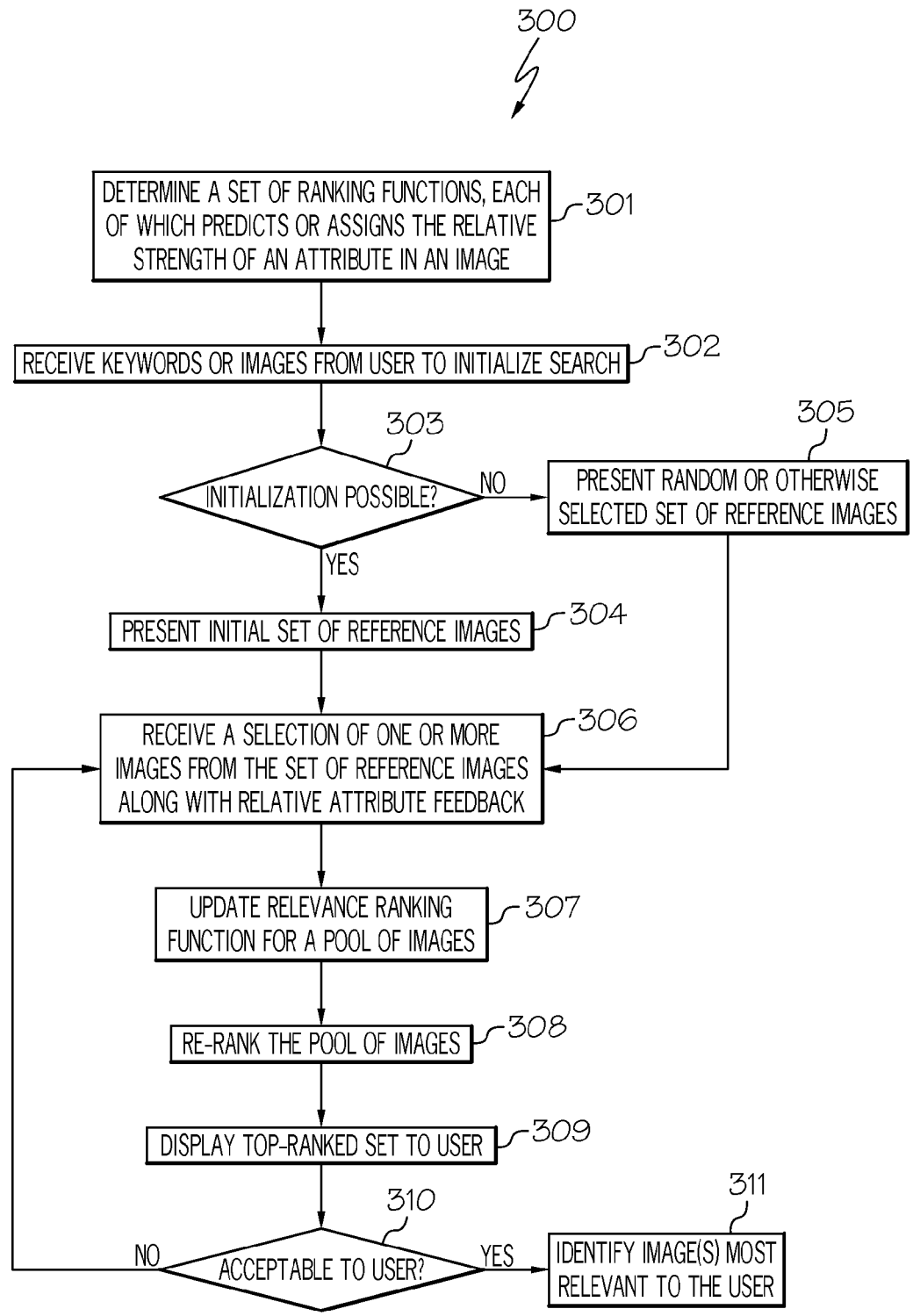
FIG. 3 is a flowchart of a method for efficiently identifying images most relevant to a user using attribute feedback in accordance with an embodiment of the present invention.
Figure 4:
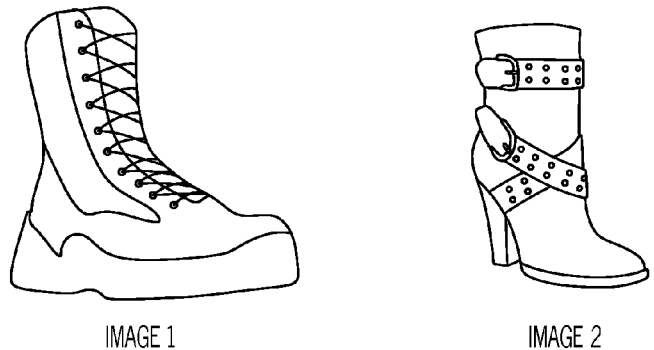
FIG. 4 illustrates two images of a shoe, where a human annotator is asked to judge whether the shoe in image 1 is more or less or equally feminine to the shoe in image 2 in accordance with an embodiment of the present invention.
Figure 5:
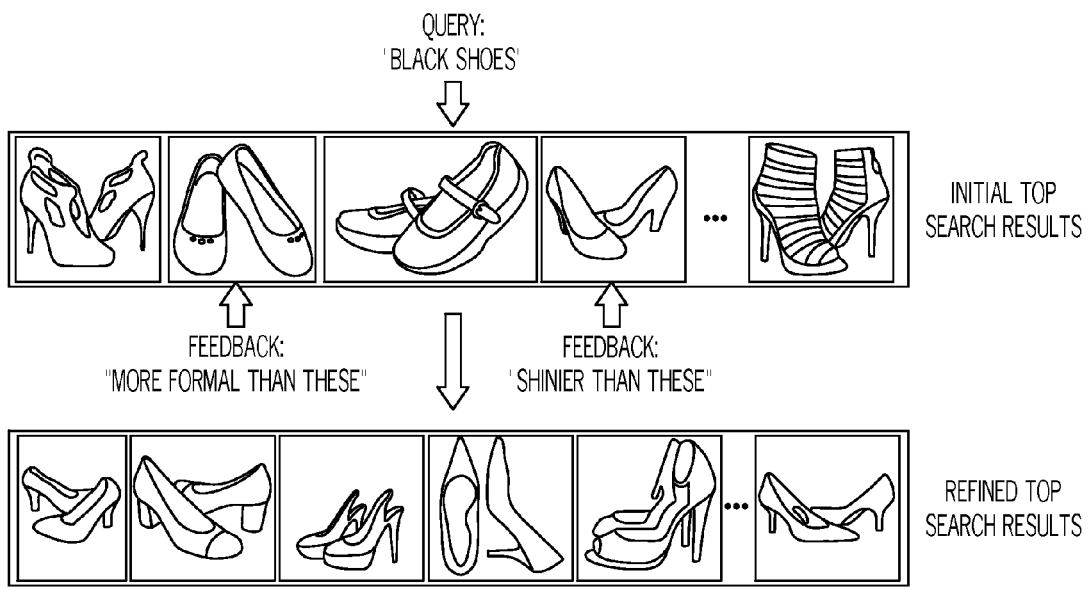
FIG. 5 illustrates a set of reference images provided to the user in accordance with an embodiment (in this embodiment, the application is image search) of the present invention.

The principles of the present invention provides a means for efficiently identifying images (e.g., photographs, illustrations, online products), videos, documents, or audio files that are most relevant to the user based on attribute feedback as discussed further below in connection with FIGS. 3-5. FIG. 3 is a flowchart of a method for efficiently identifying images (or videos, documents, or audio files) that are most relevant to the user based on attribute feedback. FIG. 4 illustrates two images of a shoe, where a human annotator is asked to judge whether the shoe in image 1 is more or less or equally feminine to the shoe in image 2. FIG. 5 illustrates a set of reference images provided to the user.

As stated above, FIG. 3 is a flowchart of a method 300 for efficiently identifying images most relevant to a user, such as a user of client device 101 (FIG. 1), using attribute feedback in accordance with an embodiment of the present invention.

Referring to FIG. 3, in conjunction with FIGS. 1 and 2, server 102 determines a set of ranking functions, each of which predicts the relative strength of an attribute in an image (e.g., photographs, illustrations, online products) from a pool of database images. An attribute, as used herein, refers to the human-nameable semantic concepts of interest in an image, document, video, or audio file. For example, a user shopping for shoes may involve attributes such as shininess, heel height, colorfulness, etc. In another example, scene descriptions could contain attributes such as openness, naturalness, and depth. These attributes are relative properties, representing a comparative property to instances in other images of the same product, scene, etc. For instance, referring to the example of the user shopping for shoes, some shoes may be shinier than others. Some shoes may have a higher heel height than others. Some shoes may be more colorful than others. The concept of relative attributes may be expressed in what is referred to herein as "ranking functions." These functions can be learned or manually specified. Offline, a set of ranking functions is obtained, each of which predicts the relative strength of a nameable attribute in an image (e.g., the degree of shininess, furriness, etc.). Similarly, in the case of documents, videos, or music, a relative attribute function is a function that estimates the degree with which a property is present in the given content (e.g., the conservativeness of the news article document, the tempo speed or mood of the audio file, or the colorfulness of the video).

Typically, semantic attributes are learned as categories: a given image either exhibits the concept or it does not, and so a classification approach to predict attribute presence is sufficient. In contrast, to express feedback on the attributes, relative attribute models are used to predict the degree to which an attribute is present. Therefore, a ranking function for each attribute in a given vocabulary is learned. This ranking function could take a variety of forms depending on the embodiment; for example, it might be a classifier, a regression function, an ordinal regression function, or a learned ranking function. The key point is that it is a function that can accept an image (or video, document, or audio file) as input and produce a numerical value as output that represents how strongly an attribute is present in that instance. For example, suppose there is a vocabulary of M attributes $A=\{a_m\}$, which may be generic or domain-specific for the image search problem of interest. For instance, in the domain of images, a domain-specific vocabulary for shoe shopping could contain attributes, such as "shininess," "heel height," "colorfulness," etc.; whereas, for scene descriptions it could contain attributes like "openness," "naturalness," and "depth." In one embodiment, such a vocabulary is provided. In another embodiment, such a vocabulary is discovered automatically, or interactively via a human-in-the-loop or mined from the web or other sources of text relevant to the domain at hand. To leverage the proposed relative attribute feedback, attribute predictions (or some form of manual annotations) are provided on all images, and a means to aggregate cumulative constraints on individual attributes may also be performed, as discussed further below.

In one embodiment, for each attribute $a_m$, supervision on a set of image pairs (i,j) in the training set I is obtained. Human annotators are asked to judge whether that attribute has a stronger presence in image i or j, or if it is equally strong in both. Such judgments can be subtle, so on each pair multiple redundant responses are collected from multiple human annotators, for example using an interface as illustrated in FIG. 4. FIG. 4 illustrates two images of a shoe and the human annotator is asked to judge whether the shoe in image 1 is more or less or equally feminine to the shoe in image 2 in accordance with an embodiment of the present invention. In a similar manner, relative attributes can be learned for documents, music, and videos by presenting human annotators examples that should be compared according to the named property of interest.

In one embodiment, to distill reliable relative constraints for training, only those for which most labelers agree are used. This yields a set of ordered image pairs $O_m=\{(i,j)\}$ and a set of un-ordered pairs $E_m=\{(i,j)\}$ such that $(i,j) \in E_m \implies i \sim j$, i.e., image i has stronger presence of attribute $a_m$ than j, and $(i,j) \in O_m \implies i \succ j$, i.e. i and j have equivalent strengths of $a_m$.

In one embodiment, the design for constraint collection is stressed: rather than ask the annotators to give an absolute score reflecting how much the attribute m is present, the annotators are asked to make comparative judgments on two exemplars (example images) at a time. This is both more natural for an individual annotator, and also permits seamless integration of the supervision from many annotators, each of whom may have a different internal "calibration" for the attribute strengths. In another embodiment, the supervision from annotators may simply be given in terms of raw attribute strengths, such that a regression function or classifier or other predictive function could be learned or hand coded.

Next, to learn an attribute's ranking function, the large-margin formulation of Joachims (KDD, 2002) is employed. Suppose each image $I_i$ is represented in $\mathbb{R}^d$ by a feature vector $x_i$ (for example, color histograms and Gist). M ranking functions are learned, one per attribute:

$$r_m(x) = w_m^T x_i, \quad (EQ\ 1)$$

for m=1, . . . , M, such that the maximum number of the following constraints is satisfied:

$$\forall (i,j) \in O_m: w_m^T x_i > w_m^T x_j \quad (EQ\ 2)$$

$$\forall (i,j) \in E_m: w_m^T x_i = w_m^T x_j. \quad (EQ\ 3)$$

In one embodiment, a large-margin learning to rank objective by Joachims is learned to optimize parameters of the ranking functions. Joachims' algorithm approximates this NP hard problem by introducing (1) a regularization term that prefers a wide margin between the ranks assigned to the closest pair of training instances, and (2) slack variable $\xi_{ij}$, $\gamma_{ij}$ on the constraints, yielding the following:

$$\text{minimize} \left( \frac{1}{2} \|w_m^T\|_2^2 + C \left( \sum \xi_{ij}^2 + \sum \gamma_{ij}^2 \right) \right) \quad (EQ\ 4)$$

$$\text{s.t.} \quad w_m^T x_i \geq w_m^T x_j + 1 - \xi_{ij};$$

$$\forall (i,j) \in O_m$$

$$|w_m^T x_i - w_m^T x_j| \leq \gamma_{ij};$$

$$\forall (i,j) \in E_m$$

$$\xi_{ij} \geq 0;$$

$$\gamma_{ij} \geq 0,$$

where C is a constant penalty. The objective is reminiscent of standard support vector machine (SVM) training (and is solvable using similar decomposition algorithms), except the linear constraints enforce relative orderings rather than labels. The method is kernelizable, and thus can also be used to learn non-linear ranking functions.

In another embodiment, a ranking function taking a non-linear form is used. That is, the ranking function is parameterized in a form more general than the linear form shown above $r_m(x)=w_m^T x_i$, and other algorithms aside from Joachims' large-margin method can be employed to do the training.

Having trained M such functions, the extent to which each attribute is present may be predicted in any novel image, by applying the learned functions $r_1, \ldots r_M$ to its image descriptor x. This training can be done before the search query or feedback is issued, and the data I used for training attribute rankers need not be the same as the database pool of examples. Alternatively, the attribute functions can be trained and updated as the search process continues, if new training data is accumulated. Similarly, as throughout, these functions are equally applicable to data items other than images, including videos, documents, or audio files.

The approach of the present invention extends the learning process to incorporate image-level relative comparisons ("image A exhibits more smiling than image B"). While training from category-level comparisons is more expedient and can also be applied, the image-level supervision is useful in order to reliably capture those attributes that do not closely follow category boundaries. The 'smiling' attribute is a good example of this contrast, since a given person (the category) need not be smiling to an equal degree in each of his/her photos.

In another embodiment, regression functions, classifiers, or hand-coded functions are used to build the attribute strength prediction functions.

In another embodiment, rather than learn predictive functions to estimate attribute strengths, the attributes are manually annotated in the images. That is, throughout, the system can use either machine-predicted or human-annotated attribute strengths on the database and reference images.

With the ranking functions learned (or otherwise specified) as above, any image in the database may be mapped into an M-dimensional space, where each dimension corresponds to the relative rank prediction for one attribute. It is in this feature space that the query refinement from a user's feedback is handled.

In step 302, server 102 receives initial input from the user to initialize the search. The initial input can be one or more keywords from the user of client device 101. For example, the user may provide the name of a general class of interest ("shoes") or some multi-attribute query ("black high-heeled shoes"). Alternatively, the initial input could be one or more image example(s), audio file(s), document(s) or video(s). After receiving such keyword(s) or example(s), application 204 of server 102 iteratively refines the search using feedback on the attributes in an efficient manner as discussed further below.

In step 303, a determination is made by server 102 as to whether initialization is possible based on the keyword(s), image(s), document(s), video(s) or audio file(s) provided by the user.

If initialization is possible based on the keyword(s), image(s), document(s), video(s) or audio file(s) provided by the user, then, in step 304, server 102 presents an initial set of reference images for feedback. If, however, initialization is not possible, then, in step 305, server 102 presents a set of reference images for feedback automatically chosen in some other manner, for example, selected at random, or selected to be representative instances within the database pool.

Throughout, let $P=\{I_1, \ldots, I_N\}$ refer to the pool of N database images that are ranked by the system using its current scoring function $S_t: I \rightarrow R$, where t denotes the iteration of refinement. The scoring function is trained using all accumulated feedback from iterations $1, \ldots, t-1$, and it supplies an ordering (possibly partial) on the images in P. At each iteration, the top $K \leq N$ ranked images $T_t=\{I_{t1}, \ldots, I_{tK}\} \subseteq P$ are displayed to the user for further feedback, where $S_t(I_{t1}) \geq S_t(I_{t2}) \geq \ldots \geq S_t(I_{tK})$. A user then gives feedback of his choosing on any or all of the K refined results in $T_t$. $T_t$ is referred to herein interchangeably as the reference set or the top-ranked set.

In another embodiment, rather than display the top-ranked relevant images to the user as candidate reference images, the system chooses the reference images for display in another manner. For example, that set could consist of random images from the database, or a set of images selected to be representative of all images in the database, etc.

Upon presenting the initial set of reference images for feedback in step 304 or upon presenting an otherwise selected (e.g., random) set of reference images for feedback in step 305, in step 306, server 102 receives a selection by the user of one or more images from the set of reference images along with relative attribute feedback (e.g., "shinier than these shoes," "more formal than these shoes") pertaining to the attribute(s) of the one or more selected images as illustrated in FIG. 5. Similarly, if the domain is document, video, or music retrieval, the analogous feedback is given.

FIG. 5 illustrates a set of reference images provided to the user of client device 101 in accordance with an embodiment of the present invention. Referring to FIG. 5, the user of client device 101 provides attribute feedback (e.g., "more formal than these shoes," "shinier than these shoes") pertaining to one or more attributes (e.g., formality, shininess) on one or more images from the set of reference images provided to the user. Similarly, if the domain is document, video, or audio retrieval, the analogous feedback is given.

Returning to FIG. 3, in conjunction with FIGS. 1-2, in step 307, server 102 updates a relevance ranking function for the pool of database examples in response to receiving the relative attribute feedback pertaining to the attribute(s) of the selected image(s) or document(s), audio file(s) or video(s). In step 308, server 102 re-ranks the pool of database examples in response to the updating of the relevance ranking function. In step 309, server 102 displays a top-ranked set of the re-ranked pool of database examples to the user of client device 101 as illustrated in FIG. 5.

Referring again to FIG. 5, after receiving the attribute feedback from the user, server 102 performs steps 307-309 resulting in a display of a refined set of search results that more closely matches the image (or document, video, or audio content) envisioned by the user.

Returning to FIG. 3, in conjunction with FIGS. 1-2, in step 310, a determination is made by server 102 as to whether an image(s) of the displayed set of top-ranked images are acceptable to the user. For example, the user may indicate that one or more of the images provided to the user are what the user has envisioned.

If an image(s) of the displayed set of top-ranked images are acceptable to the user, then, in step 311, server 102 has identified an image(s) most relevant to the user. Similarly, if a document(s), video(s), or audio file(s) of the displayed set of top-ranked results are acceptable to the user, then the server has found an example that is relevant to the user.

If, however, the image(s) of the displayed set of reference images are not acceptable to the user, then server 102 receives from the user a further selection of one or more images along with relative attribute feedback (e.g., "shinier than these shoes," "more formal than these shoes") pertaining to an attribute of the one or more selected images in step 306. It is noted that the attribute feedback provided by the user may be directed to either the same or a different attribute than previously directed in a prior iteration. For example, the user may provide attribute feedback directed to the "shininess" attribute in the first iteration and may provide attribute feedback directed to the "pointedness" attribute in the second iteration. It is further noted that the feedback can be on multiple reference images and multiple attributes within a single iteration (e.g., individual attributes on multiple different images). Furthermore, multiple attribute feedback can also be given on the same image (e.g., multiple statements on multiple attributes about one image). In a similar manner, feedback for documents, videos, or audio files can be given on any number of selected reference images, and on any number of their attributes, at each iteration of feedback.

A more detailed discussion of steps 306-311 of method 300 is provided below.

A user of the system has a mental model of the target visual content (or document content, audio content, or video content) the user seeks. To refine the current search results, the user surveys the K top-ranked images (or documents, audio files, or videos) in $T_t$, and uses some of them as reference examples with which to better express the user's envisioned optimal result. These relative constraints are given for some combination of example(s) and attribute(s) of the user's choosing. The conjunction of all such user feedback statements gives a set of constraints for updating the scoring function. For all statements of the form "I want images exhibiting more of attribute m than reference image $I_{t_r}$," the updated attribute-based scoring function $S_{t+1}{}^a$ should satisfy:

$$S_{t+1}{}^a(I_i) > S_{t+1}{}^a(I_j), \forall I_i, I_j \in \mathcal{P}$$

$$\text{s.t. } r_m(x_i) > r_m(x_{t_r}), r_m(x_j) \leq r_m(x_{t_r}), \quad \text{(EQ 5)}$$

where as before $x_i$ denotes the image descriptor for image $I_i$ used to predict its relative attributes. This simply reflects that images having more of the desired property m than the displayed reference image are better than those that do not. The relative attribute values on all database images are either predicted using the learned function $r_m$, or else available as ground truth from human manual annotation. As above, this step applies in a similar form when searching for documents, audio files, or videos.

Similarly, for all statements of the form "I want images exhibiting less of attribute m than $I_{t_r}$," the updated scoring function should satisfy:

$$S_{t+1}{}^a(I_i) > S_{t+1}{}^a(I_j), \forall I_i, I_j \in \mathcal{P}$$

$$\text{s.t. } r_m(x_i) < r_m(x_{t_r}), r_m(x_j) \geq r_m(x_{t_r}) \quad \text{(EQ 6)}$$

For all statements of the form, "I want images that are similar in terms of attribute m to $I_{t_r}$," the constraints are:

$$S_{t+1}{}^a(I_i) > S_{t+1}{}^a(I_j), \forall I_i, I_j \in \mathcal{P}$$

$$\text{s.t. } (r_m(x_{t_r}) - \epsilon) \leq r_m(x_i) \leq (r_m(x_{t_r}) + \epsilon),$$

$$r_m(x_j) < r_m(x_{t_r}) - \epsilon \text{ or } r_m(x_j) > r_m(x_{t_r}) + \epsilon, \quad \text{(EQ 7)}$$

where $\epsilon$ is a constant specifying the distance in relative attribute space at which instances are considered dissimilar. It is noted that these similarity constraints differ from binary feedback, in that they single out an individual attribute. In one embodiment, the implementation focuses on the two relative forms of feedback (more, less). In another embodiment, the implementation focuses on the equality feedback statements (e.g., "what I want is similarly shiny to this.") As above, this step applies in a similar form when searching for documents, music, or videos.

In another embodiment, the feedback provided by the user is of the form, "What I want is much more (much less) m than image $I_{t_r}$.". In other words, the user specifies the degree of the difference in relative attribute, not only the polarity.

Each of the above carves out a relevant region of the M-dimensional attribute feature space, whittling away images (or documents, music, or videos) not meeting the user's requirements. All such constraints are combined to adapt the scoring function. This can be done in different ways. For example, the scoring function can simply count the number of constraints satisfied so far. That is, the intersection of all F feedback constraints is taken thus far to identify the set of top ranked images, yielding $S_{t+1}{}^a(I_i)$=F. Those satisfying all but one constraint receive score F−1, and so on, until images satisfying no constraints receive the score 0. Even if no images satisfy all constraints, a relevance ranking can be produced. Alternatively, the scoring function can be a learned function that uses the feedback constraints to optimize its parameters.

It is noted that the proposed form of relative attribute feedback refines the search in ways that a straightforward multi-attribute or keyword query cannot. That is, if a user were to simply state the attribute labels of interest ("show me black shoes that are shiny and high-heeled"), one can easily retrieve the images whose attribute predictions meet those criteria. However, since the user's description is in absolute terms, it cannot change based on the retrieved images. In contrast, with access to relative attributes as a mode of communication, for every new set of reference images returned by server 102, the user can further refine the user's description. Similarly, this property remains for the domains of documents, music, and videos.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

While method 300 discusses the aspect of solely using relative attribute feedback to iteratively refine the user's search, the principles of the present invention may be applied to combining the use of the relative attribute feedback mechanism with the binary relevance feedback mechanism (e.g., for image search, with a user identifying an image as either relevant or not relevant). In such an embodiment, one can consider a learned hybrid scoring function. The basic idea is to learn a ranking function $S_{t+1}{}^h$ that unifies both forms of constraints. R and $\bar{R}$ denote the sets of reference images for which the user has given positive and negative binary feedback, respectively. Let $\mathcal{F}_k \subset \mathcal{P}$ denote the subset of images satisfying k of the relative attribute feedback constraints, for k=0, . . . , F. A set of ordered image pairs is defined as:

$$O_s = \{\{\mathbb{R} \times \bar{\mathbb{R}}\} \cup \{\mathcal{F}_F \times \mathcal{F}_{F-1}\} \cup \ldots \cup \{\mathcal{F}_1 \times \mathcal{F}_0\}\}, \quad \text{(EQ 8)}$$

where x denotes the Cartesian product. This set $O_s$ reflects all the desired ranking preferences—that relevant images be ranked higher than irrelevant ones, and that images satisfying more relative attribute preferences be ranked higher than those satisfying fewer. As equivalence constraints, the following occurs:

$$E_s = \{\{\mathcal{F}_F \times \mathcal{F}_F\} \cup \ldots \cup \{\mathcal{F}_1 \times \mathcal{F}_1\}\}, \quad (EQ\ 9)$$

reflecting that images satisfying the same amount of relative feedback should be ranked equally high. It is noted that the subscript s in $O_s$ and $E_s$ distinguishes the sets from those indexed by m above, which were used to train relative attribute ranking functions.

Using training constraints $O_s$ and $E_s$, a function that predicts relative relevance for the current user with the large-margin objective in EQ 4 is learned. The result is a set of parameters $w_s$, that serves as the hybrid scoring function $S_{t+1}^h$. Pairs in $O_s$ and $E_s$ can be randomly sampled to generate representative constraints for training.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for efficiently identifying images, videos, audio files or documents relevant to a user, the method comprising:
   determining a set of attribute ranking functions, each of which predicts or assigns a relative strength of an attribute in an image, video, audio file or document from a pool of ranked database images, videos, audio files or documents;
   presenting a set of reference images, videos, audio files or documents from said pool of database images, videos, audio files or documents;
   receiving a selection of one or more images, videos, audio files or documents from said set of reference images, videos, audio files or documents along with relative attribute feedback pertaining to one or more attributes of said selected one or more images, videos, audio files or documents, wherein said relative attribute feedback comprises feedback regarding a desired degree of a characteristic of an attribute; and
   revising, by a processor, a system's model of what images, videos, audio files or documents are relevant to said user by updating one or more relevance ranking functions of a set of relevance ranking functions using said relative attribute feedback and said set of attribute ranking functions, wherein said set of relevance ranking functions are used to rank said database images, videos, audio files or documents based on how relevant said database images, videos, audio files or documents are to a user's search.

2. The method as recited in claim 1 further comprising:
   training said set of relevance ranking functions using said relative attribute feedback.

3. The method as recited in claim 1 further comprising:
   updating a relevance ranking function for said set of database images, videos, audio files or documents in response to receiving said relative attribute feedback pertaining to said one or more attributes of said selected one or more images, videos, audio files or documents;
   re-ranking said pool of database images, videos, audio files or documents in response to updating said relevance ranking function; and
   displaying a top-ranked set of said re-ranked pool of database images, videos, audio files or documents.

4. The method as recited in claim 3 further comprising:
   identifying an image, video, audio file or document relevant to said user in response to an image, video, audio file or document of said displayed top-ranked set of said re-ranked pool of database images, videos, audio files or documents being acceptable to said user.

5. The method as recited in claim 3 further comprising:
   receiving a selection of one or more images, videos, audio files or documents from said displayed set of said re-ranked pool of database images, videos, audio files or documents along with relative attribute feedback pertaining to said one or more attributes of said selected one or more images, videos, audio files or documents from said displayed set of said re-ranked pool of database images, videos, audio files or documents;
   updating said relevance ranking function a subsequent time for said set of database images, videos, audio files or documents in response to receiving said relative attribute feedback pertaining to said one or more attributes of said selected one or more images, videos, audio files or documents from said displayed set of said re-ranked pool of database images, videos, audio files or documents;
   re-ranking said pool of database images, videos, audio files or documents a subsequent time in response to updating said relevance ranking function said subsequent time; and
   displaying a subsequent top-ranked set of said re-ranked pool of database images, videos, audio files or documents.

6. The method as recited in claim 1 further comprising:
   receiving one or more keywords, images, audio files, documents or videos to initialize a search for an image, video, audio file or document; and
   presenting said set of reference images, videos, audio files or documents based on said one or more keywords, images, audio files, documents or videos.

7. The method as recited in claim 1, wherein said set of reference images, videos, audio files or documents is a random or otherwise automatically selected set of top-ranked images, videos, audio files or documents from said pool of database images, videos, audio files or documents.

8. A computer program product embodied in a non-transitory computer readable storage medium for efficiently identifying images, videos, audio files or documents relevant to a user, the computer program product comprising the programming instructions for:
   determining a set of attribute ranking functions, each of which predicts or assigns a relative strength of an attribute in an image, video, audio file or document from a pool of ranked database images, videos, audio files or documents;
   presenting a set of reference images, videos, audio files or documents from said pool of database images, videos, audio files or documents;
   receiving a selection of one or more images, videos, audio files or documents from said set of reference images, videos, audio files or documents along with relative attribute feedback pertaining to one or more attributes of said selected one or more images, videos, audio files or documents, wherein said relative attribute feedback comprises feedback regarding a desired degree of a characteristic of an attribute; and revising a system's model of what images, videos, audio files or documents are relevant to said user by updating one or more relevance ranking functions of a set of relevance ranking functions using said relative attribute feedback and said set of attribute ranking functions, wherein said set of relevance ranking functions are used to rank said database images, videos, audio files or documents based on how relevant said database images, videos, audio files or documents are to a user's search.

9. The computer program product as recited in claim 8 further comprising the programming instructions for:

training said set of relevance ranking functions using said relative attribute feedback.

10. The computer program product as recited in claim 8 further comprising the programming instructions for:

updating a relevance ranking function for said set of database images, videos, audio files or documents in response to receiving said relative attribute feedback pertaining to said one or more attributes of said selected one or more images, videos, audio files or documents;

re-ranking said pool of database images, videos, audio files or documents in response to updating said relevance ranking function; and displaying a top-ranked set of said re-ranked pool of database images, videos, audio files or documents.

11. The computer program product as recited in claim 10 further comprising the programming instructions for:

identifying an image, video, audio file or document relevant to said user in response to an image, video, audio file or document of said displayed top-ranked set of said re-ranked pool of database images, videos, audio files or documents being acceptable to said user.

12. The computer program product as recited in claim 10 further comprising the programming instructions for:

receiving a selection of one or more images, videos, audio files or documents from said displayed set of said re-ranked pool of database images, videos, audio files or documents along with relative attribute feedback pertaining to said one or more attributes of said selected one or more images, videos, audio files or documents from said displayed set of said re-ranked pool of database images, videos, audio files or documents;

updating said relevance ranking function a subsequent time for said set of database images, videos, audio files or documents in response to receiving said relative attribute feedback pertaining to said one or more attributes of said selected one or more images, videos, audio files or documents from said displayed set of said re-ranked pool of database images, videos, audio files or documents;

re-ranking said pool of database images, videos, audio files or documents a subsequent time in response to updating said relevance ranking function said subsequent time; and displaying a subsequent top-ranked set of said re-ranked pool of database images, videos, audio files or documents.

13. The computer program product as recited in claim 8 further comprising the programming instructions for:

receiving one or more keywords, images, audio files, documents or videos to initialize a search for an image, video, audio file or document; and presenting said set of reference images, videos, audio files or documents based on said one or more keywords, images, audio files, documents or videos.

14. The computer program product as recited in claim 8, wherein said set of reference images, videos, audio files or documents is a random or otherwise automatically selected set of top-ranked images, videos, audio files or documents from said pool of database images, videos, audio files or documents.

15. A system, comprising:

a memory unit for storing a computer program for efficiently identifying images, videos, audio files or documents relevant to a user; and a processor coupled to said memory unit, wherein said processor, responsive to said computer program, comprises:

circuitry for determining a set of attribute ranking functions, each of which predicts or assigns a relative strength of an attribute in an image, video, audio file or document from a pool of ranked database images, videos, audio files or documents;

circuitry for presenting a set of reference images, videos, audio files or documents from said pool of database images, videos, audio files or documents;

circuitry for receiving a selection of one or more images, videos, audio files or documents from said set of reference images, videos, audio files or documents along with relative attribute feedback pertaining to one or more attributes of said selected one or more images, videos, audio files or documents, wherein said relative attribute feedback comprises feedback regarding a desired degree of a characteristic of an attribute; and circuitry for revising a system's model of what images, videos, audio files or documents are relevant to said user by updating one or more relevance ranking functions of a set of relevance ranking functions using said relative attribute feedback and said set of attribute ranking functions, wherein said set of relevance ranking functions are used to rank said database images, videos, audio files or documents based on how relevant said database images, videos, audio files or documents are to a user's search.

16. The system as recited in claim 15, wherein said processor further comprises:

circuitry for training said set of relevance ranking functions using said relative attribute feedback.

17. The system as recited in claim 15, wherein said processor further comprises:

circuitry for updating a relevance ranking function for said set of database images, videos, audio files or documents in response to receiving said relative attribute feedback pertaining to said one or more attributes of said selected one or more images, videos, audio files or documents;

circuitry for re-ranking said pool of database images, videos, audio files or documents in response to updating said relevance ranking function; and circuitry for displaying a top-ranked set of said re-ranked pool of database images, videos, audio files or documents.

18. The system as recited in claim 17, wherein said processor further comprises:

circuitry for identifying an image, video, audio file or document relevant to said user in response to an image, video, audio file or document of said displayed top-ranked set of said re-ranked pool of database images, videos, audio files or documents being acceptable to said user.

19. The system as recited in claim 17, wherein said processor further comprises:

circuitry for receiving a selection of one or more images, videos, audio files or documents from said displayed set of said re-ranked pool of database images, videos, audio files or documents along with relative attribute feedback pertaining to said one or more attributes of said selected one or more images, videos, audio files or documents from said displayed set of said re-ranked pool of database images, videos, audio files or documents;

circuitry for updating said relevance ranking function a subsequent time for said set of database images, videos, audio files or documents in response to receiving said relative attribute feedback pertaining to said one or more attributes of said selected one or more images, videos, audio files or documents from said displayed set of said re-ranked pool of database images, videos, audio files or documents;

circuitry for re-ranking said pool of database images, videos, audio files or documents a subsequent time in response to updating said relevance ranking function said subsequent time; and circuitry for displaying a subsequent top-ranked set of said re-ranked pool of database images, videos, audio files or documents.

20. The system as recited in claim 15, wherein said processor further comprises:

circuitry for receiving one or more keywords, images, audio files, documents or videos to initialize a search for an image, video, audio file or document; and circuitry for presenting said set of reference images, videos, audio files or documents based on said one or more keywords, images, audio files, documents or videos.

21. The system as recited in claim 15, wherein said set of reference images, videos, audio files or documents is a random or otherwise automatically selected set of top-ranked images, videos, audio files or documents from said pool of database images, videos, audio files or documents.

* * * * *